United States Patent
Shyu

[11] Patent Number: 6,049,399
[45] Date of Patent: Apr. 11, 2000

[54] METHOD AND APPARATUS WITH REDUCED LOOK-UP TABLES FOR CONVERTING LUMINANCE-CHROMINANCE COLOR SPACE SIGNALS TO RGB COLOR SPACE SIGNALS

[75] Inventor: Rong-Fuh Shyu, Hsinchu, Taiwan

[73] Assignee: Winbond Electronics Corp., Hsinchu, Taiwan

[21] Appl. No.: 08/964,089

[22] Filed: Nov. 4, 1997

[51] Int. Cl.[7] ............................................. G03F 3/08
[52] U.S. Cl. ................................... 358/520; 358/523
[58] Field of Search ........................... 358/515, 520, 358/523, 524, 539, 540; 382/162, 167; 348/488, 496, 450, 453, 638, 645

[56] References Cited

U.S. PATENT DOCUMENTS

| | | | |
|---|---|---|---|
| 4,306,247 | 12/1981 | Tomimoto et al. | 348/624 |
| 4,417,270 | 11/1983 | Nagao et al. | 348/624 |
| 4,507,676 | 3/1985 | Dischert et al. | 358/30 |
| 4,742,386 | 5/1988 | Wilkinson | 358/13 |
| 4,829,455 | 5/1989 | Long et al. | 364/521 |
| 4,835,599 | 5/1989 | Sigel | 358/30 |
| 5,124,688 | 6/1992 | Rumball | 340/703 |
| 5,262,847 | 11/1993 | Rodriguez et al. | 358/21 R |
| 5,504,821 | 4/1996 | Kanamori et al. | 382/167 |
| 5,510,852 | 4/1996 | Shyu | 348/660 |
| 5,512,960 | 4/1996 | Hatano | 348/640 |
| 5,541,658 | 7/1996 | Ishiwata | 348/394 |
| 5,654,768 | 8/1997 | Hatano | 348/640 |
| 5,798,753 | 8/1998 | Zhou et al. | 345/154 |
| 5,818,613 | 10/1998 | Masterson et al. | 358/520 |
| 5,821,919 | 10/1998 | Coelho | 345/154 |
| 5,841,422 | 11/1998 | Shyu | 345/154 |

*Primary Examiner*—Madeleine Nguyen
*Attorney, Agent, or Firm*—Christie, Parker & Hale, LLP

[57] ABSTRACT

In a method and apparatus for reducing the number of look-up tables when converting digitized luminance-chrominance color space signals to digitized RGB color space signals, first, second, third and fourth matrix multiplication operations of the digitized chrominance color space signals are performed. The first matrix multiplication operation has a first result to be used in conversion for the digitized R color space signal. The second and third matrix multiplication operations have second and third results to be used in conversion for the digitized G color space signal. The fourth matrix multiplication operation has a fourth result to be used in conversion for the B color space signal. One of the first and fourth matrix multiplication operations, and one of the second and third matrix multiplication operations are associated with the same one of the digitized chrominance color space signals and are jointly implemented in a single look-up table unit.

22 Claims, 5 Drawing Sheets

METHOD AND APPARATUS WITH REDUCED LOOK-UP TABLES FOR CONVERTING LUMINANCE-CHROMINANCE COLOR SPACE SIGNALS TO RGB COLOR SPACE SIGNALS

BACKGROUND OF THE INVENTION

1. Field of the Invention

The invention relates to a method and apparatus for performing color space conversion, more particularly to a method and apparatus with reduced look-up tables for converting digitized luminance-chrominance color space signals to digitized RGB color space signals.

2. Description of the Related Art

It is desirable to merge a video signal with graphic signals in a multi-media computer system. The video signal may come from a television image processing system having a capture or frame grabbing capability, or from a compressed video playback of a CD-ROM or network transmission. Color space conversion is needed in image processing applications to convert luminance-chrominance color space signals, which offer the advantages of a lower transmission bandwidth and a lower data storage requirement, into RGB color space signals, which are used when displaying an image on a computer monitor.

CCIR 601, which was proposed by the Comite Consultatif International des Radiocommunications (CCIR), establishes the following formulas for converting from the YCbCr luminance-chrominance color space to the RGB color space:

$$R = Y + 1.402(Cr-128) \qquad (a.1)$$
$$G = Y - 0.714(Cr-128) - 0.344(Cb-128) \qquad (a.2)$$
$$B = Y + 1.772(Cb-128) \qquad (a.3)$$

If U and V are used to represent the shifted chrominance components (Cb-128) and (Cr-128), respectively, Equations (a.1) to (a.3) can be rewritten as follows:

$$R = Y + 1.402V \qquad (b.1)$$
$$G = Y - 0.714V - 0.344U \qquad (b.2)$$
$$B = Y + 1.772U \qquad (b.3)$$

where Y ranges between [0, 255], and U and V range between [-128, 1271] in an 8-bit representation for each of the Y, Cb and Cr color space components.

Color space conversion is often implemented by employing multipliers or look-up tables to achieve the matrix multiplication operations. Look-up tables are preferred because of their less complicated constructions. It is noted that the matrix multiplication operations dominate the hardware complexity of a color space converting apparatus. As such, the number of look-up tables is critical in determining the cost of implementing the color space converting apparatus. To implement the YCbCr to RGB color space conversion of Equations (a.1) to (a.3), a conventional color space converter usually requires four look-up tables to perform the matrix multiplication of chrominance components. Although the use of four look-up tables is less expensive to implement as compared to another conventional color space converter which uses a 3-by-3 multiplication matrix, a further reduction in the number of look-up tables is desirable.

In a co-pending U.S. patent application, entitled "Method And Apparatus Requiring Fewer Number of Look-Up Tables For Converting Luminance Chrominance Color Space Signals To RGB Color Space Signals," and filed on Jun. 10, 1997 by the Applicant, it has been proposed that, by linearly combining the conversion formulas, equations (b.1) to (b.3) can be rearranged as follows to result in RGB color combination signals:

$$R - G = 0.714(2V) + 0.344(U + 2V) \qquad (c.1)$$
$$B - G = 0.714(2U + V) + 0.344(2U) \qquad (c.2)$$
$$R + B - G = Y + 0.714(2U + 2V) + 0.344(2U + 2V) \qquad (c.3)$$
$$B + G = 2Y + 0.714(2U - V) \qquad (c.4)$$
$$R + G = 2Y + 0.344(2V - U) \qquad (c.5)$$

Equations (c.1) to (c.5) list a set of possible linear combinations of equations (b.1) to (b.3). Consequently, as Equations (c.1) to (c.5) use only two coefficients, namely 0.714 and 0.344, for matrix multiplications, no more than two look-up tables may be used to convert luminance-chrominance color space signals to RGB color combination signals. Therefore, conversion from the luminance-chrominance color space to the RGB color space can be implemented using fewer than four look-up tables by converting the luminance-chrominance color space signals to the RGB color combination signals expressed as a function of predetermined linear combinations of the chrominance color space signals as defined by the appropriate conversion formulas, and by linearly combining the resulting RGB color combination signals to obtain the RGB color space signals.

The apparatus disclosed in the aforementioned U.S. patent application comprises: a first combining unit for generating a plurality of linear combinations of the chrominance color space signals and at least one binary combination of the luminance color space signal; a multiplexed multiplication unit connected to the first combining unit to receive the linear combinations of the chrominance color space signals therefrom, the multiplexed multiplication unit including no more than two look-up tables which contain digitized transformation values for performing matrix multiplications of the linear combinations of the chrominance color space signals; a second combining unit connected to the multiplexed multiplication unit and the first combining unit, the second combining unit linearly combining the digitized transformation values outputted by the multiplexed multiplication unit and the binary combination of the luminance color space signal to generate three RGB color combination signals; and a third combining unit connected to the second combining unit, the third combining unit linearly combining the RGB color combination signals to obtain the RGB color space signals.

While the apparatus of the aforementioned U.S. patent application permits conversion of digitized luminance-chrominance color space signals to digitized RGB color space signals using less than four look-up tables, it is desirable to further reduce the sizes of the look-up tables used therein so that a cost-effective hardware implementation can be achieved.

SUMMARY OF THE INVENTION

Therefore, the main object of the present invention is to provide a color space converting method and apparatus which employs a small number of look-up table units to implement the matrix multiplication operations when converting digitized luminance-chrominance color space signals to digitized RGB color space signals.

More specifically, the object of the present invention is to provide a color space converting method and apparatus in which plural matrix multiplications that are associated with the same chrominance signal are jointly implemented using a single look-up table unit to result in a small number of the look-up table units for converting digitized luminance-chrominance color space signals to digitized RGB color space signals.

Another object of the present invention is to provide a color space converting method and apparatus which employs coded look-up table units of reduced sizes to implement the matrix multiplication operations when converting digitized luminance-chrominance color space signals to digitized RGB color space signals, thereby resulting in a relatively inexpensive but highly efficient construction.

According to one aspect of the invention, in a method for converting digitized luminance-chrominance color space signals to digitized RGB color space signals, first, second, third and fourth matrix multiplication operations of the digitized chrominance color space signals are first performed. The first matrix multiplication operation has a first result to be used in conversion for the digitized R color space signal. The second and third matrix multiplication operations have second and third results to be used in conversion for the digitized G color space signal. The fourth matrix multiplication operation has a fourth result to be used in conversion for the B color space signal. One of the first and fourth matrix multiplication operations and one of the second and third matrix multiplication operations are associated with the same one of the digitized chrominance color space signals and are jointly implemented in a single look-up table unit.

According to another aspect of the invention, an apparatus for converting digitized luminance-chrominance color space signals to digitized RGB color space signals comprises means for performing first, second, third and fourth matrix multiplication operations of the digitized chrominance color space signals. The first matrix multiplication operation performing means has a first result to be used in conversion for the digitized R color space signal. The second and third matrix multiplication operation performing means have second and third results to be used in conversion for the digitized G color space signal. The fourth matrix multiplication operation performing means has a fourth result to be used in conversion for the B color space signal. One of the first and fourth matrix multiplication operations performed by one of the first and fourth matrix multiplication operation performing means, and one of the second and third matrix multiplication operations performed by one of the second and third matrix multiplication operation performing means are associated with the same one of the digitized chrominance color space signals. Said one of the first and fourth matrix multiplication operation performing means and said one of the second and third matrix multiplication operation performing means are jointly implemented in a single look-up table unit.

Preferably, the look-up table unit has first and second outputs, and outputs a corresponding codeword that contains a first transformation code corresponding to the result of said one of the first and fourth matrix multiplication operation performing means at the first output, and a second transformation code corresponding to the result of said one of the second and third matrix multiplication operation performing means at the second output when the look-up table unit is addressed by the same one of the digitized chrominance color space signals.

In one embodiment, the look-up table unit includes a first data field which contains the first transformation codes, and a second data field which contains the second transformation codes.

In another embodiment, the look-up table unit includes a look-up table portion which has an average data field and an error data field. The average data field contains average conversion codes which are average codes of the first and second transformation codes. The error data field contains error conversion codes which are differences between the average conversion codes and corresponding ones of the first and second transformation codes. The look-up table portion outputs one of the average conversion codes and the corresponding one of the error conversion codes when addressed by the same one of the digitized chrominance color space signals. First combining means, such as an adder, combines an outputted one of the average conversion codes and the corresponding one of the error conversion codes to generate the corresponding one of the first transformation codes at the first output. Second combining means, such as a subtracter, combines the outputted one of the average conversion codes and the corresponding one of the error conversion codes to generate the corresponding one of the second transformation codes at the second output.

Preferably, the apparatus further comprises means for performing arithmetic shift operations of at least one of the digitized chrominance color space signals to obtain a plurality of binary conversion codes of said at least one of the digitized chrominance color space signals having coefficients of integral powers of 2. The first result of the first matrix multiplication operation performing means, the digitized luminance color space signal, and at least one of the digitized chrominance color space signals and the binary conversion codes are combined to obtain a first resultant sum, and the first resultant sum is clipped to a range that represents binary code of the R color space signal. The second and third results of the second and third matrix multiplication operation performing means, the digitized luminance color space signal, and at least one of the digitized chrominance color space signals and the binary conversion codes are combined to obtain a second resultant sum, and the second resultant sum is clipped to a range that represents binary code of the G color space signal. The fourth result of the fourth matrix multiplication operation performing means, the digitized luminance color space signal, and at least one of the digitized chrominance color space signals and the binary conversion codes are combined to obtain a third resultant sum, and the third resultant sum is clipped to a range that represents binary code of the B color space signal.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
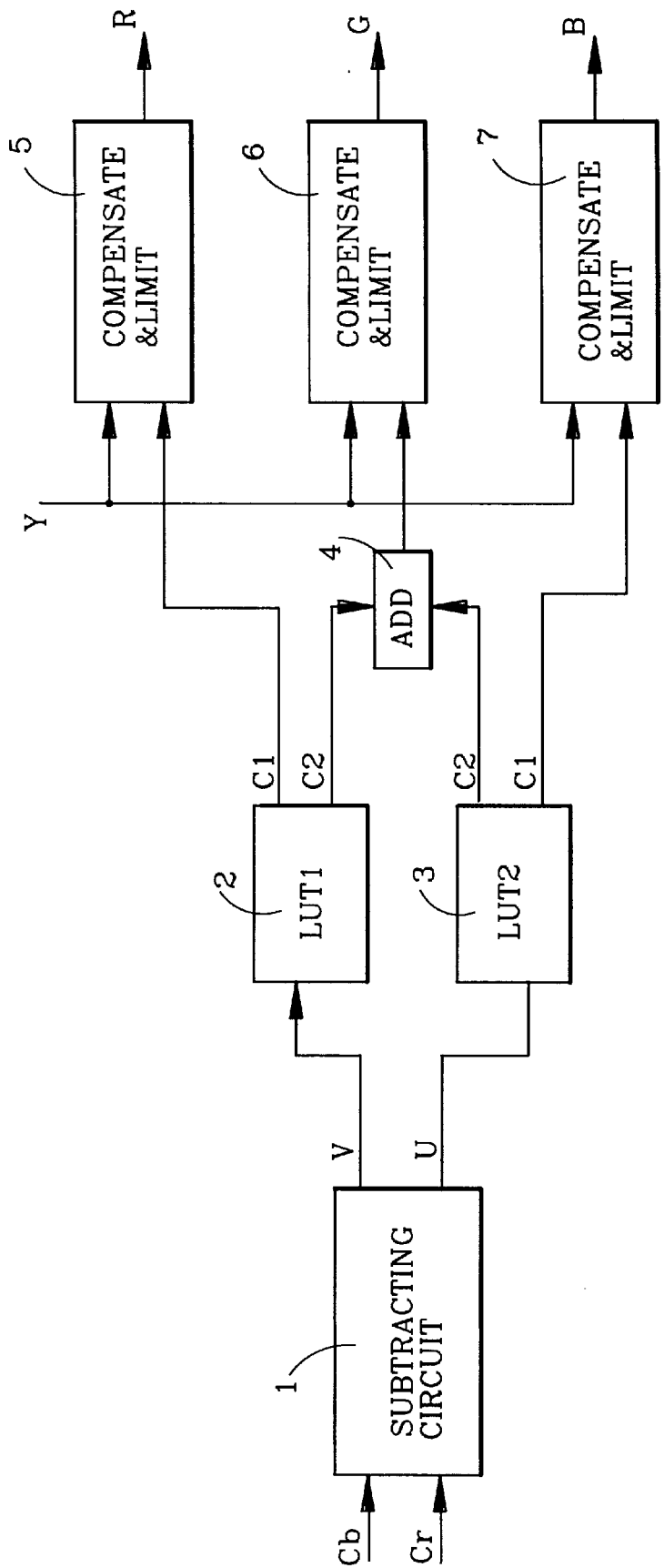
FIG. 1 is a functional block diagram of the first preferred embodiment of a color space converting apparatus according to the present invention.

Before the present invention is described in greater detail, it should be noted that like elements are denoted by the same reference numerals throughout the disclosure.

Referring to FIG. 1, the first preferred embodiment of a color space converting apparatus for converting digitized YCbCr luminance-chrominance color space signals to digitized RGB color space signals in accordance with this invention is shown to comprise a subtracting circuit 1, first and second look-up table units 2 and 3, a combining unit 4, and first to third compensate-and-limit circuits 5, 6 and 7. Color space conversion is performed according to the following equations:

| | |
|---|---|
| R = Y + 1.402V | (b.1) |
| G = Y − 0.714V − 0.344U | (b.2) |
| B = Y + 1.772U | (b.3) |

The subtracting circuit 1 receives the digitized Cb and Cr chrominance signals and shifts the same by subtracting a constant value of 128 therefrom to obtain the digitized U and V chrominance signals, respectively. The subtracting circuit 1 is optional if the input chrominance signals are the digitized V and U chrominance signals instead of the digitized Cb and Cr chrominance signals.

The digitized V and U chrominance signals are directed to the first and second look-up table units 2 and 3, respectively. The first look-up table unit 2 contains transformation codes for performing the V-in-R and V-in-G matrix multiplication operations which are associated with the V chrominance signal, namely 1.402 V and −0.714 V. The second look-up table unit 3 contains transformation codes for performing the U-in-B and U-in-G matrix multiplication operations which are associated with the U chrominance signal, namely 1.772 U and −0.344 U.

The first look-up table unit 2 has a first output (C1) for providing the 1.402 V transformation codes, and a second output (C2) for providing the −0.714 V transformation codes. The second look-up table unit 3 has a first output (C1) for providing the 1.772 U transformation codes, and a second output (C2) for providing the −0.344 U transformation codes.

The first compensate-and-limit circuit 5 adds the digitized Y luminance signal to the first output (C1) of the first look-up table unit 2, and clips the resultant sum to within a range that represents the binary code of the R color space signal.

The combining unit 4 includes an adder for adding together the second outputs (C2) of the first and second look-up table units 2 and 3. The second compensate-and-limit circuit 6 adds the digitized Y luminance signal to the output of the combining unit 4, and clips the resultant sum to within a range that represents the binary code of the G color space signal.

The third compensate-and-limit circuit 7 adds the digitized Y luminance signal to the first output (C1) of the second look-up table unit 3, and clips the resultant sum to within a range that represents the binary code of the B color space signal.

Figure 2:
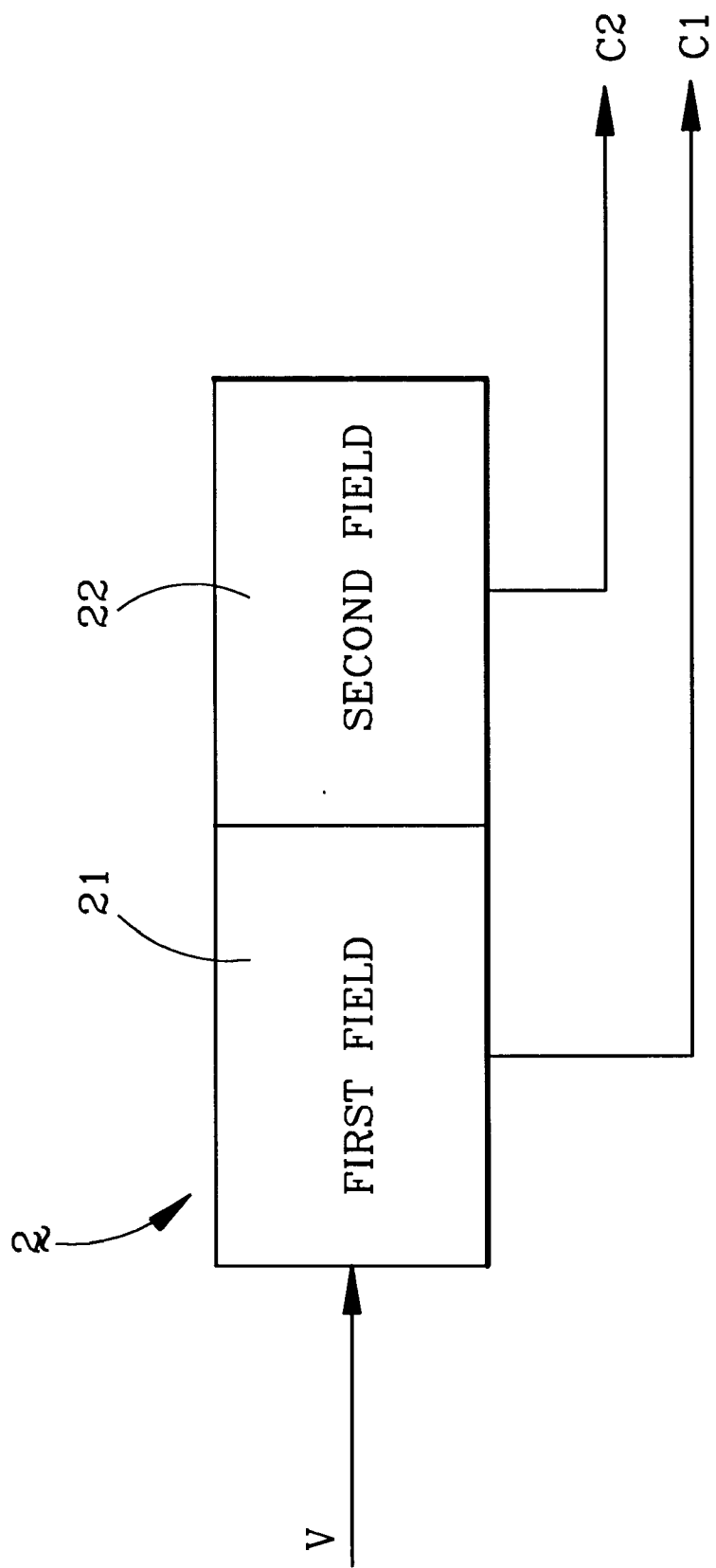
FIG. 2 shows an arrangement of a look-up table unit employed in the first preferred embodiment.

FIG. 2 illustrates an arrangement of the look-up table units employed in the first preferred embodiment. The first look-up table unit 2 is taken as an example in the Figure. As illustrated, the first look-up table unit 2 includes a first data field 21 which contains the V-in-R (or 1.402 V) transformation codes, and a second data field 22 which contains the V-in-G (or −0.714 V) transformation codes. When the V chrominance signal addresses the first look-up table unit 2, a corresponding codeword that contains a first transformation code from the first data field 21 and a second transformation code from the second data field 22 is outputted via the outputs (C1) and (C2), whereby the first transformation code is provided at the first output (C1) whereas the second transformation code is provided at the second output (C2), Accordingly, the second look-up table unit 3 includes a first data field which contains the U-in-B (or 1.772 U) transformation codes, and a second data field which contains the U-in-G (or −0.344 U) transformation codes. When the U chrominance signal addresses the second look-up table unit 3, a corresponding codeword that contains a first transformation code from the first data field and a second transformation code from the second data field is outputted via the outputs (C1) and (C2), whereby the first transformation code is provided at the first output (C1) whereas the second transformation code is provided at the second output (C2), The sizes of the first and second look-up table units 2 and 3 of the first preferred embodiment are determined as follows: Since each of the Y, Cb and Cr color space signals is digitally represented in 8 bits, the U and V chrominance signals range from −128 to 127.
Therefore,
1.402 V ranges between [−179.5, 178.1] and requires at least 9 bits to represent the same,
−0.714 V ranges between [−90.7, 91.4] and requires at least 8 bits to represent the same,
1.772 U ranges between [−226.8, 225.0] and requires at least 9 bits to represent the same, and
−0.344 U ranges between [−43.7, 44.0] and requires at least 7 bits to represent the same.

As such, the first look-up table unit 2 requires at least 17 bits to represent a codeword, while the second look-up table unit 3 requires at least 16 bits to represent a codeword. Additional bits may be needed to represent each codeword for precision purposes.

Figure 3:
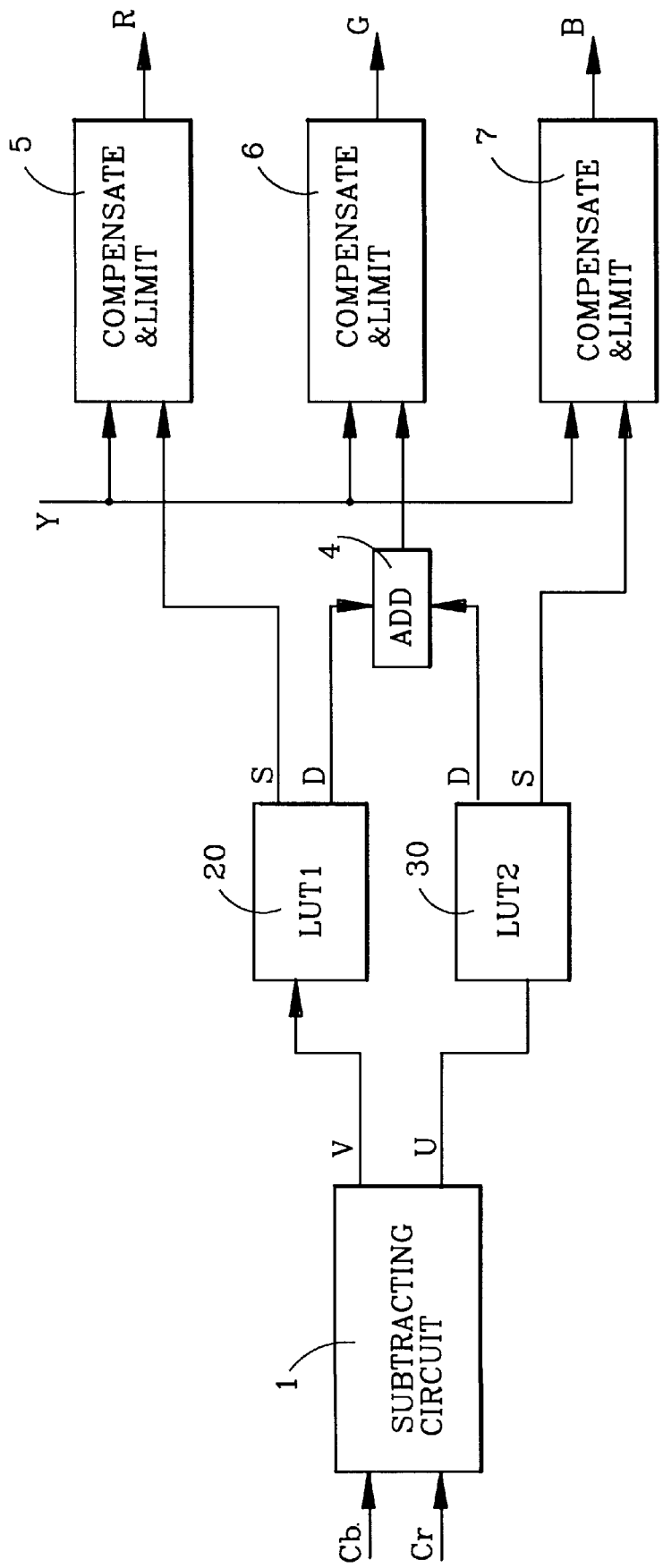
FIG. 3 is a functional block diagram of the second preferred embodiment of a color space converting apparatus according to the present invention.

Referring to FIG. 3, the second preferred embodiment of a color space converting apparatus for converting digitized YCbCr color space signals to digitized RGB color space signals in accordance with this invention is shown to comprise a subtracting circuit 1, first and second look-up table units 20 and 30, a combining unit 4, and first to third compensate-and-limit circuits 5, 6 and 7. Unlike the previous embodiment, an average-and-deviation coding method is applied in the first and second look-up table units 20 and 30.

As with the first preferred embodiment, color space conversion is performed according to the following equations:

| | |
|---|---|
| R = Y + 1.402V | (b.1) |
| G = Y − 0.714V − 0.344U | (b.2) |
| B = Y + 1.772U | (b.3) |

The subtracting circuit 1 receives the digitized Cb and Cr chrominance signals and shifts the same by subtracting a constant value of 128 therefrom to obtain the digitized U and V chrominance signals, respectively.

The digitized V and U chrominance signals are directed to the first and second look-up table units 20 and 30, respectively. The first look-up table unit 20 performs the V-in-R and V-in-G matrix multiplication operations which are associated with the V chrominance signal, namely 1.402 V and −0.714 V. The first look-up table unit 20 has a first output (S) for providing the 1.402 V transformation codes, and a second output (D) for providing the −0.714 V transformation codes. The second look-up table unit 30 performs the U-in-B and U-in-G matrix multiplication operations which are associated with the U chrominance signal, namely 1.772 U and −0.344 U. The second look-up table unit 30 has a first output (S) for providing the 1.772 U transformation codes, and a second output (D) for providing the −0.344 U transformation codes.

The first compensate-and-limit circuit 5 adds the digitized Y luminance signal to the first output (S) of the first look-up table unit 20, and clips the resultant sum to within a range that represents the binary code of the R color space signal.

The combining unit 4 includes an adder for adding together the second outputs (D) of the first and second look-up table units 20 and 30. The second compensate-and-limit circuit 6 adds the digitized Y luminance signal to the output of the combining unit 4, and clips the resultant sum to within a range that represents the binary code of the G color space signal.

The third compensate-and-limit circuit 7 adds the digitized Y luminance signal to the first output (S) of the second look-up table unit 30, and clips the resultant sum to within a range that represents the binary code of the B color space signal.

Figure 4:
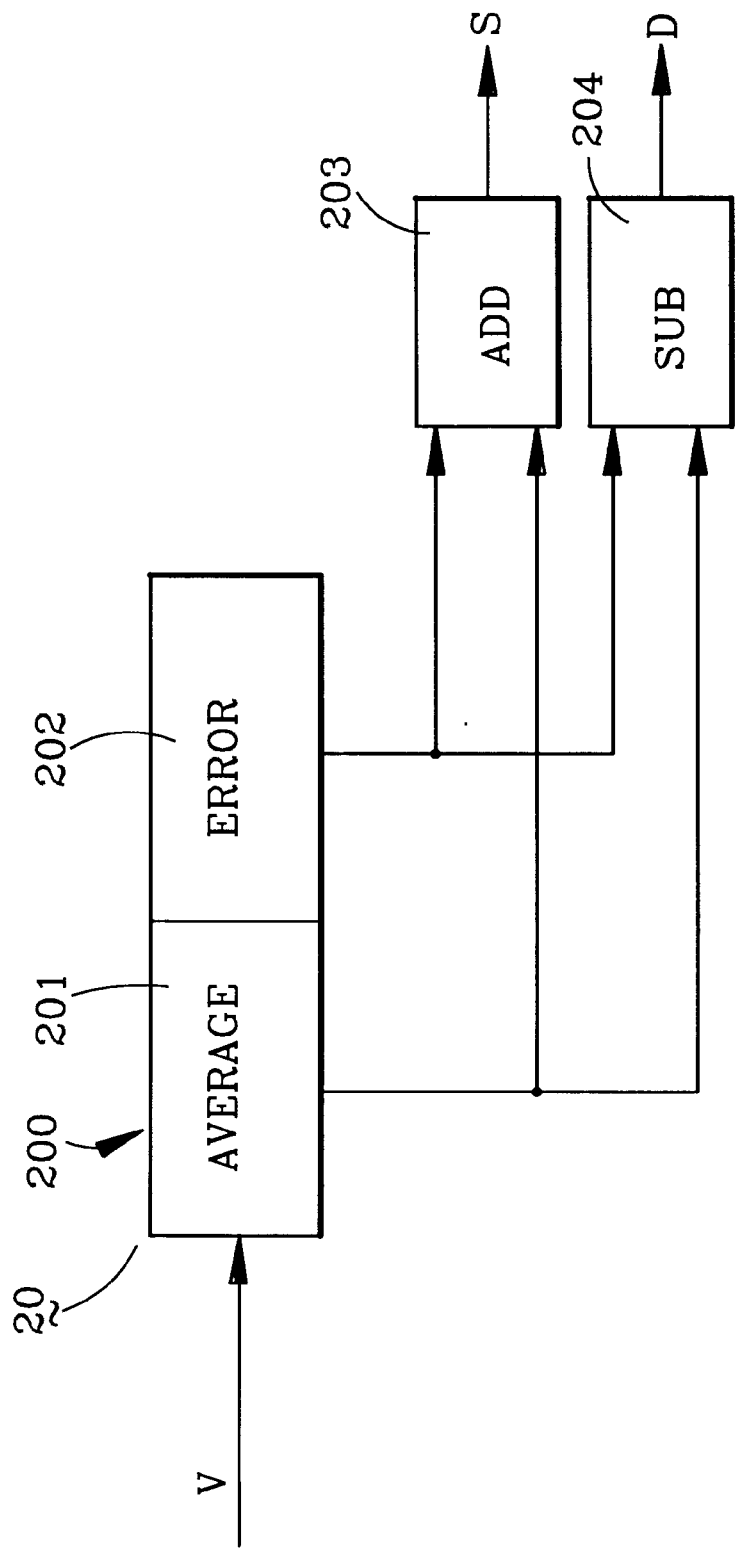
FIG. 4 is a block diagram of a look-up table unit employed in the second preferred embodiment.

FIG. 4 is a block diagram of the look-up table units employed in the second preferred embodiment. The first look-up table unit 20 is taken as an example in this Figure. As shown, the first look-up table unit 20 includes a look-up table portion 200, which has an average data field 201 and an error data field 202. The average data field 201 contains 1.058 V average conversion codes, which are average codes of the desired 1.402 V and 0.714 V transformation codes. The error data field 202 contains 0.344 V error conversion codes, which correspond to the differences between the 1.058 V average conversion codes and corresponding ones of the desired 1.402 V and 0.714 V transformation codes. When the look-up table portion 200 is addressed by the V chrominance signal, an adder 203 of the first look-up table unit 20 adds an average conversion code from the average data field 201 and a corresponding error conversion code from the error data field 202 to provide the 1.402 V transformation code at the first output (S), while a subtracter 204 of the first look-up table unit 20 subtracts the average conversion code from the corresponding error conversion code to provide the −0.714 V transformation code at the second output (D).

For the second look-up table unit 30, the average data field of the look-up table portion thereof contains 1.058 U average conversion codes, which are average codes of the desired 1.772 U and 0.344 U transformation codes, while the error data field contains 0.714 U error conversion codes, which correspond to the differences between the 1.058 U average conversion codes and corresponding ones of the desired 1.772 U and 0.344 U transformation codes. The operation of the second look-up table unit 30 is generally similar to that of the first look-up table unit 20 and will not be detailed further.

The sizes of the look-up table portions of the first and second look-up table units 20 and 30 of the second preferred embodiment are determined as follows: As mentioned beforehand, both the U and V chrominance signals range from −128 to 127. Therefore, 1.058 V ranges between [−135.4, 134.4] and requires at least 9 bits to represent the same, 0.344 V ranges between [−44.0, 43.71] and requires at least 7 bits to represent the same, 1.058 U ranges between [−135.4, 134.4] and requires at least 9 bits to represent the same, and 0.714 U ranges between [−91.4, 90.7] and requires at least 8 bits to represent the same.

As such, the first look-up table unit 20 requires at least 16 bits to represent a codeword, while the second look-up table unit 30 requires at least 17 bits to represent a codeword.

Figure 5:
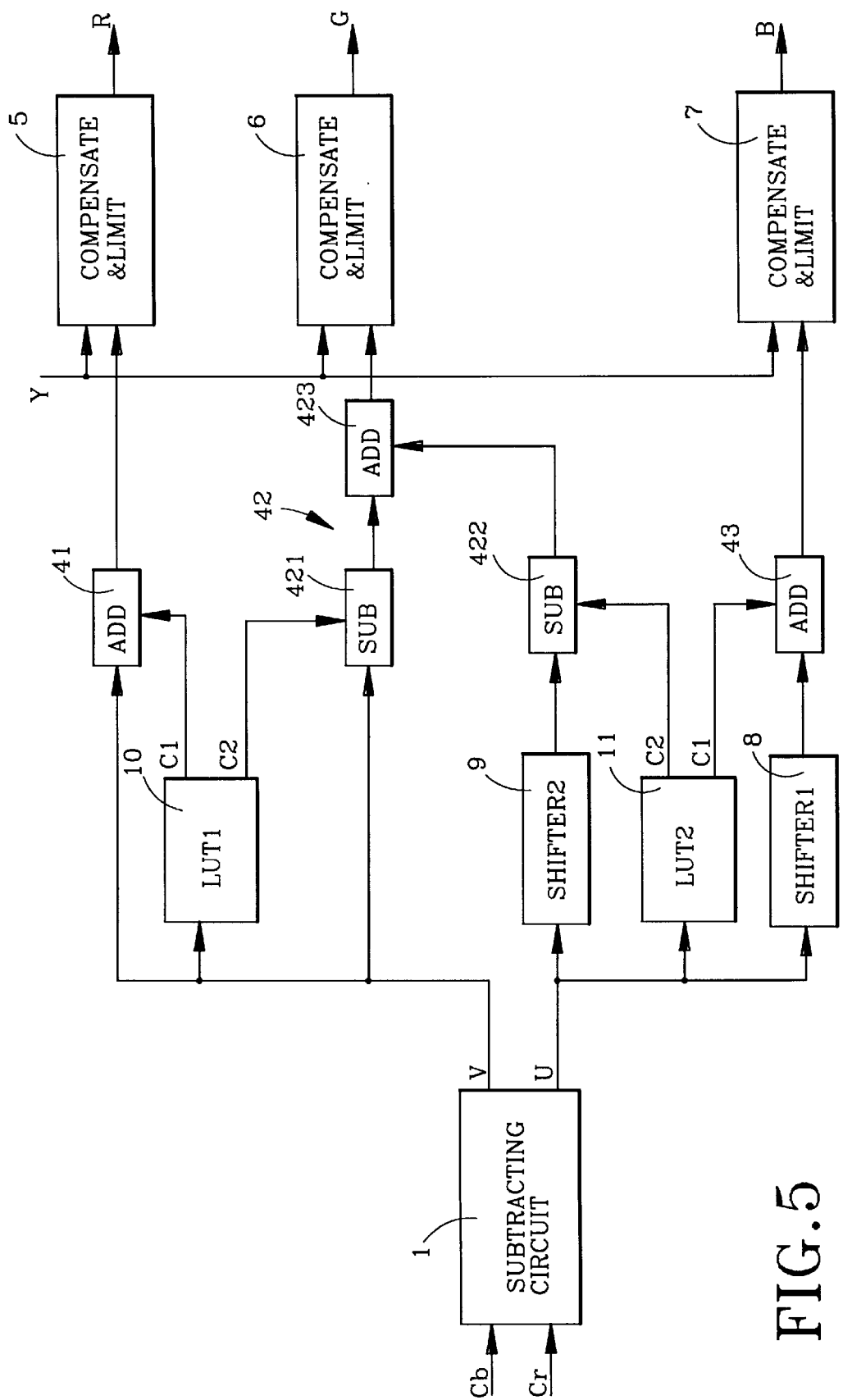
FIG. 5 is a functional block diagram of the third preferred embodiment of a color space converting apparatus according to the present invention.

FIG. 5 illustrates the third preferred embodiment of a color space converting apparatus for converting digitized YCbCr color space signals to digitized RGB color space signals in accordance with this invention. In this embodiment, equations (b.1), (b.2) and (b.3) are modified by expressing each of the original transformation codes therein as a binary conversion code of the associated chrominance signal having a coefficient of an integral power of 2, and a remainder conversion code as follows:

$1.402\ V = 2^0\ V + 0.402\ V$ $0.714\ V = 2^0\ V - 0.286\ V$ $0.344\ U = 2^{-1}\ U - 0.156\ U$ $1.772\ U = 2^1\ U - 0.228\ U$

Expansion of the original transformation codes should not be limited to the above expressions. However, expressions which permit implementation of the matrix multiplication operations with high efficiency, such as those listed above, are preferred.

The third preferred embodiment comprises a subtracting circuit 1, first and second look-up table units 10 and 11, first and second arithmetic shifting units 8 and 9, first to third combining units 41, 42 and 43, and first to third compensate-and-limit circuits 5, 6 and 7.

The subtracting circuit 1 receives the digitized Cb and Cr chrominance signals and shifts the same by subtracting a constant value of 128 therefrom to obtain the digitized U and V chrominance signals, respectively.

The first look-up table unit 10 performs V-in-R and V-in-G matrix multiplication operations which are associated with the V chrominance signal, namely the 0.402 V and 0.286 V remainder conversion codes. The second look-up table unit 11 performs U-in-B and U-in-G matrix multiplication operations which are associated with the U chrominance signal, namely the −0.228 U and 0.156 U remainder conversion codes.

The first look-up table unit 10 has a first output (C1) for providing the 0.402 V remainder conversion codes, and a second output (C2) for providing the 0.286 V remainder conversion codes. The second look-up table unit 11 has a first output (C1) for providing the −0.228 U remainder conversion codes, and a second output (C2) for providing the 0.156 U remainder conversion codes. The arrangements of the first and second look-up table units 10 and 11 are similar to that shown in FIG. 2 and will not be described further.

The binary conversion codes of the expanded transformation codes can be obtained by shifting the U chrominance signal. As illustrated, the U chrominance signal is received by the first arithmetic shifting unit 8, which performs an arithmetic one-bit left-shift of the U chrominance signal to obtain the 2 U binary conversion code, and by the second arithmetic shifting unit 9, which performs an arithmetic one-bit right-shift of the U chrominance signal to obtain the 0.5 U binary conversion code.

The first combining unit 41 includes an adder for adding the first output (C1) of the first look-up table unit 10 and the V chrominance signal to obtain the 1.402 V transformation code. The first compensate-and-limit circuit 5 adds the digitized Y luminace signal to the output of the first combining unit 41, and clips the resultant sum to within a range that represents the binary code of the R color space signal.

The second combining unit 42 includes a first subtracter 421 for subtracting the V chrominance signal from the second output (C2) of the first look-up table unit 10 to obtain the −0.714 V transformation code, a second subtracter 422 for subtracting the output of the second arithmetic shifting unit 9 from the second output (C2) of the second look-up table unit 11 to obtain the −0.344 U transformation code, and an adder 423 for adding together the outputs of the first and second subtracters 421 and 422. The second compensate-and-limit circuit 6 adds the digitized Y luminance signal to the output of the adder 423, and clips the resultant sum to within a range that represents the binary code of the G color space signal.

The third combining unit 43 includes an adder for adding the output of the first arithmetic shifting unit 8 to the first output (C1) of the second look-up table unit 11 to obtain the 1.772 U transformation code. The third compensate-and-limit circuit 7 adds the digitized Y luminance signal to the output of the third combining unit 43, and clips the resultant sum to within a range that represents the binary code of the B color space signal.

The sizes of the first and second look-up table units 10 and 11 of the third preferred embodiment are determined as follows: As mentioned beforehand, both the U and V chrominance signals range from −128 to 127. Therefore, 0.402 V ranges between [−51.5, 51.1] and requires at least 7 bits to represent the same, 0.286 V ranges between [−36.6, 36.3] and requires at least 7 bits to represent the same, −0.228 U ranges between [−29.0, 29.21] and requires at least 6 bits to represent the same, and 0.156 U ranges between [−20.0, 19.8] and requires at least 6 bits to represent the same.

As such, the first look-up table unit 10 requires at least 14 bits to represent a codeword, while the second look-up table unit 11 requires at least 12 bits to represent a codeword. Thus, by expressing each of the original transformation codes of equations (b.1), (b.2) and (b.3) as a binary conversion code of the associated chrominance signal having a coefficient of an integral power of 2, and a relatively small remainder conversion code, the sizes of the look-up table units 10 and 11 of the third preferred embodiment can be reduced as compared to those of the previous embodiments.

In the fourth preferred embodiment of the present invention, the average-and deviation coding method of the second preferred embodiment is applied to the first and second look-up table units of the third preferred embodiment to further reduce the sizes of the same. As such, each of the first and second look-up table units of the fourth preferred embodiment will have a block diagram similar to that shown in FIG. 4. The first look-up table unit of the fourth preferred embodiment includes a look-up table portion which has an average data field and an error data field. The average data field contains 0.344 V average conversion codes, which are average codes of the desired 0.402 V and 0.286 V remainder conversion codes. The error data field contains 0.058 V error conversion codes, which correspond to the differences between the 0.344 V average conversion codes and corresponding ones of the desired 0.402 V and 0.286 V remainder conversion codes. When the look-up table portion of the first look-up table unit of the fourth preferred embodiment is addressed by the V chrominance signal, an adder of the first look-up table unit adds an average conversion code from the average data field and a corresponding error conversion code from the error data field to provide the 0.402 V remainder conversion code at the first output of the first look-up table unit, while a subtracter of the first look-up table unit subtracts the corresponding error conversion code from the average conversion code to provide the 0.286 V remainder conversion code at the second output of the first look-up table unit.

For the second look-up table unit of the fourth preferred embodiment, the average data field of the look-up table portion thereof contains 0.192 U average conversion codes, which are average codes of the desired 0.228 U and 0.156 U remainder conversion codes, while the error data field of the look-up table portion contains 0.036 U error conversion codes, which correspond to the differences between the 0.192 U average conversion codes and corresponding ones of the desired 0.228 U and 0.156 U remainder conversion codes. When the look-up table portion of the second look-up table unit of the fourth preferred embodiment is addressed by the U chrominance signal, an adder of the second look-up table unit adds an average conversion code from the average data field and a corresponding error conversion code from the error data field to provide the 0.228 U remainder conversion code at the first output of the second look-up table unit, while a subtracter of the second look-up table unit subtracts the corresponding error conversion code from the average conversion code to provide the 0.156 U remainder conversion code at the second output of the second look-up table unit.

Aside from differences in the arrangements of the first and second look-up table units, the adder 43 of the third preferred embodiment is replaced by a subtracter in the fourth preferred embodiment to subtract 0.228 U from the output of the first arithmetic shifting unit 8. Since the other components of the fourth preferred embodiment are similar in structure and operation to those found in the third preferred embodiment, a detailed description of the same will be abbreviated herein.

The sizes of the first and second look-up table units of the fourth preferred embodiment are determined as follows: Like the previous embodiments, both the U and V chrominance signals range from −128 to 127. Therefore, 0.344 V ranges between [−44.0, 43.7] and requires at least 7 bits to represent the same, 0.058 V ranges between [−7.4, 7.41] and requires at least 4 bits to represent the same, 0.192 U ranges between [−24.6, 24.6] and requires at least 6 bits to represent the same, and 0.036 U ranges between [−4.6, 4.6] and requires at least 4 bits to represent the same.

As such, for this embodiment, the first look-up table unit requires at least 11 bits to represent a codeword, while the second look-up table unit requires at least 10 bits to represent a codeword. Therefore, the minimum sizes of the look-up table units of this embodiment are the smallest among the disclosed preferred embodiments.

It should be noted that, although the preferred embodiments are shown as hard-wired blocks in a dedicated hardware circuitry, the present invention may be easily and efficiently implemented by a programmed microprocessor and the associated system memory to perform the calculations of the conversion.

It has thus been shown that, in the present invention, since each look-up table unit can perform two matrix multiplication operations which are associated with the same chrominance signal, luminance-chrominance to RGB color space conversion can be implemented using no more than two look-up tables. In addition, by expanding the transformation codes into binary and remainder conversion codes, and by applying an average-and deviation coding method to the look-up table units, the sizes of the look-up table units can be further reduced. Therefore, a relatively inexpensive and highly efficient color space converting method and apparatus can be realized. The objects of the present invention are thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for converting digitized luminance-chrominance color space signals to digitized RGB color space signals, comprising the steps of:

performing first, second, third and fourth matrix multiplication operations of the digitized chrominance color space signals, the first matrix multiplication operation having a first result in terms of a first chrominance contribution without any luminance contribution to the R color space signal to be used in conversion for the digitized R color space signal, the second and third matrix multiplication operations having second and third results in terms of second and third chrominance contributions without any luminance contribution to the G color space signal to be used in conversion for the digitized G color space signal, the fourth matrix multiplication operation having a fourth result in terms of a fourth chrominance contribution without any luminance contribution to the B color space signal to be used in conversion for the B color space signal;

wherein one of the first and fourth matrix multiplication operations and one of the second and third matrix multiplication operations are associated with a same one of the digitized chrominance color space signals and are jointly implemented in a single look-up table unit that is addressed by a same one of the digitized chrominance color space signals.

2. The method of claim 1, wherein the look-up table unit has first and second outputs, and outputs a corresponding codeword that contains a first transformation code corresponding to the result of said one of the first and fourth matrix multiplication operations at the first output, and a second transformation code corresponding to the result of said one of the second and third matrix multiplication operations at the second output when the look-up table unit is addressed by a same one of the digitized chrominance color space signals.

3. The method of claim 2, wherein the look-up table unit includes a first data field which contains the first transformation codes, and a second data field which contains the second transformation codes.

4. The method of claim 2, further comprising the steps of:

combining the first result of the first matrix multiplication operation and a digitized luminance color space signal to obtain a first resultant sum, and clipping the first resultant sum to a range that represents binary code of the R color space signal;

combining the second and third results of the second and third matrix multiplication operations and a digitized luminance color space signal to obtain a second resultant sum, and clipping the second resultant sum to a range that represents binary code of the G color space signal; and combining the fourth result of the fourth matrix multiplication operation and a digitized luminance color space signal to obtain a third resultant sum, and clipping the third resultant sum to a range that represents binary code of the B color space signal.

5. The method of claim 2, wherein the look-up table unit includes:

a look-up table portion which has an average data field and an error data field, the average data field containing average conversion codes which are average codes of the first and second transformation codes, the error data field containing error conversion codes which are differences between the average conversion codes and corresponding ones of the first and second transformation codes, the look-up table portion outputting one of the average conversion codes and the corresponding one of the error conversion codes when addressed by a same one of the digitized chrominance color space signals;

first combining means for combining an outputted one of the average conversion codes and a corresponding one of the error conversion codes in a first manner to generate a corresponding one of the first transformation codes at the first output; and second combining means for combining the outputted one of the average conversion codes and the corresponding one of the error conversion codes in a second manner to generate a corresponding one of the second transformation codes at the second output.

6. The method of claim 5, wherein the first combining means includes an adder, and the second combining means includes a subtracter.

7. The method of claim 2, further comprising the steps of:

performing arithmetic shift operations of at least one of the digitized chrominance color space signals to obtain a plurality of binary conversion codes of said at least one of the digitized chrominance color space signals having coefficients of integral powers of 2;

combining the first result of the first matrix multiplication operation, the digitized luminance color space signal, and at least one of the digitized chrominance color space signals and the binary conversion codes to obtain a first resultant sum, and clipping the first resultant sum to a range that represents binary code of the R color space signal;

combining the second and third results of the second and third matrix multiplication operations, the digitized luminance color space signal, and at least one of the digitized chrominance color space signals and the binary conversion codes to obtain a second resultant sum, and clipping the second resultant sum to a range that represents binary code of the G color space signal; and combining the fourth result of the fourth matrix multiplication operation, the digitized luminance color space signal, and at least one of the digitized chrominance color space signals and the binary conversion codes to obtain a third resultant sum, and clipping the third resultant sum to a range that represents binary code of the B color space signal.

8. The method of claim 1, wherein the chrominance color space signals are U and V color space signals.

9. The method of claim 1, wherein the chrominance color space signals are Cb and Cr color space signals, the method further comprising the step of shifting each of the Cb and Cr color space signals by a predetermined constant to obtain U and V color space signals, respectively, said one of the first and fourth matrix multiplication operations and said one of the second and third matrix multiplication operations being associated with the same one of the V and U color space signals.

10. An apparatus for converting digitized luminance-chrominance color space signals to digitized RGB color space signals, comprising:

means for performing first, second, third and fourth matrix multiplication operations of the digitized chrominance color space signals, said first matrix multiplication operation performing means having a first result in terms of a first chrominance contribution without any luminance contribution to the R color space signal to be used in conversion for the digitized R color space signal, said second and third matrix multiplication operation performing means having second and third results in terms of second and third chrominance contributions without any luminance contribution to the G color space signal to be used in conversion for the digitized G color space signal, said fourth matrix multiplication operation performing means having a fourth result in terms of a fourth chrominance contribution without any luminance contribution to the B color space signal to be used in conversion for the B color space signal;

wherein one of the first and fourth matrix multiplication operations performed by one of said first and fourth matrix multiplication operation performing means, and one of the second and third matrix multiplication operations performed by one of said second and third matrix multiplication operation performing means are associated with a same one of the digitized chrominance color space signals, said one of said first and fourth matrix multiplication operation performing means and said one of said second and third matrix multiplication operation performing means being jointly implemented in a single look-up table unit that is addressed by a same one of the digitized chrominance color space signals.

11. The apparatus of claim 10, wherein said look-up table unit has first and second outputs, and outputs a corresponding codeword that contains a first transformation code corresponding to the result of said one of said first and fourth matrix multiplication operation performing means at said first output, and a second transformation code corresponding to the result of said one of said second and third matrix multiplication operation performing means at said second output when said look-up table unit is addressed by a same one of the digitized chrominance color space signals.

12. The apparatus of claim 11, wherein said look-up table unit includes a first data field which contains the first transformation codes, and a second data field which contains the second transformation codes.

13. The apparatus of claim 11, further comprising:

means for combining the first result of said first matrix multiplication operation performing means and a digitized luminance color space signal to obtain a first resultant sum, and for clipping the first resultant sum to a range that represents binary code of the R color space signal;

means for combining the second and third results of said second and third matrix multiplication operation performing means and a digitized luminance color space signal to obtain a second resultant sum, and for clipping the second resultant sum to a range that represents binary code of the G color space signal; and means for combining the fourth result of said fourth matrix multiplication operation performing means and a digitized luminance color space signal to obtain a third resultant sum, and for clipping the third resultant sum to a range that represents binary code of the B color space signal.

14. The apparatus of claim 11, wherein said look-up table unit includes:

a look-up table portion which has an average data field and an error data field, said average data field containing average conversion codes which are average codes of the first and second transformation codes, said error data field containing error conversion codes which are differences between the average conversion codes and corresponding ones of the first and second transformation codes, said look-up table portion outputting one of the average conversion codes and the corresponding one of the error conversion codes when addressed by the same one of the digitized chrominance color space signals;

first combining means for combining an outputted one of the average conversion codes and the corresponding one of the error conversion codes in a first manner to generate the corresponding one of the first transformation codes at said first output; and second combining means for combining the outputted one of the average conversion codes and the corresponding one of the error conversion codes in a second manner to generate the corresponding one of the second transformation codes at the second output.

15. The apparatus of claim 14, wherein said first combining means includes an adder, and said second combining means includes a subtracter.

16. The apparatus of claim 11, further comprising:

means for performing arithmetic shift operations of at least one of the digitized chrominance color space signals to obtain a plurality of binary conversion codes of said at least one of the digitized chrominance color space signals having coefficients of integral powers of 2;

means for combining the first result of said first matrix multiplication operation performing means, the digitized luminance color space signal, and at least one of the digitized chrominance color space signals and the binary conversion codes to obtain a first resultant sum, and for clipping the first resultant sum to a range that represents binary code of the R color space signal;

means for combining the second and third results of said second and third matrix multiplication operation performing means, the digitized luminance color space signal, and at least one of the digitized chrominance color space signals and the binary conversion codes to obtain a second resultant sum, and for clipping the second resultant sum to a range that represents binary code of the G color space signal; and means for combining the fourth result of said fourth matrix multiplication operation performing means, the digitized luminance color space signal, and at least one of the digitized chrominance color space signals and the binary conversion codes to obtain a third resultant sum, and for clipping the third resultant sum to a range that represents binary code of the B color space signal.

17. The apparatus of claim 10, wherein the chrominance color space signals are U and V color space signals.

18. The apparatus of claim 10, wherein the chrominance color space signals are Cb and Cr color space signals, the apparatus further comprising means for shifting each of the Cb and Cr color space signals by a predetermined constant to obtain U and V color space signals, respectively, said one of said first and fourth matrix multiplication operation performing means and said one of said second and third matrix multiplication operation performing means being associated with the same one of the V and U color space signals.

19. A method for converting digitized luminance-chrominance color space signals to digitized RGB color space signals, comprising the steps of:

performing first, second, third and fourth matrix multiplication operations of the digitized chrominance color space signals, the first matrix multiplication operation having a first result to be used in conversion for the digitized R color space signal, the second and third matrix multiplication operations having second and third results to be used in conversion for the digitized G color space signal, the fourth matrix multiplication operation having a fourth result to be used in conversion for the B color space signal, wherein one of the first and fourth matrix multiplication operations and one of the second and third matrix multiplication operations are associated with the same one of the digitized chrominance color space signals and are jointly implemented in a single look-up table unit, and the look-up table unit has first and second outputs, and outputs a corresponding codeword that contains a first transformation code corresponding to the result of said one of the first and fourth matrix multiplication operations at the first output, and a second transformation code corresponding to the result of said one of the second and third matrix multiplication operations at the second output when the look-up table unit is addressed by the same one of the digitized chrominance color space signals, said look-up table unit further includes a look-up table portion which has an average data field and an error data field, the average data field containing average conversion codes which are average codes of the first and second transformation codes, the error data field containing error conversion codes which are differences between the average conversion codes and corresponding ones of the first and second transformation codes, the look-up table portion outputting one of the average conversion codes and the corresponding one of the error conversion codes when addressed by the same one of the digitized chrominance color space signals, first combining means for combining an outputted one of the average conversion codes and a corresponding one of the error conversion codes in a first manner to generate a corresponding one of the first transformation codes at the first output and second combining means for combining the outputted one of the average conversion codes and the corresponding one of the error conversion codes in a second manner to generate a corresponding one of the second transformation codes at the second output.

20. The method of claim 19, wherein the first combining means includes an adder, and the second combining means includes a subtracter.

21. An apparatus for converting digitized luminance-chrominance color space signals to digitized RGB color space signals, comprising:

means for performing first, second, third and fourth matrix multiplication operations of the digitized chrominance color space signals, said first matrix multiplication operation performing means having a first result to be used in conversion for the digitized R color space signal, said second and third matrix multiplication operation performing means having second and third results to be used in conversion for the digitized G color space signal, said fourth matrix multiplication operation performing means having a fourth result to be used in conversion for the B color space signal;

wherein one of the first and fourth matrix multiplication operations performed by one of said first and fourth matrix multiplication operation performing means, and one of the second and third matrix multiplication operations performed by one of said second and third matrix multiplication operation performing means are associated with the same one of the digitized chrominance color space signals, said one of said first and fourth matrix multiplication operation performing means and said one of said second and third matrix multiplication operation performing means being jointly implemented in a single look-up table unit, and said look-up table unit has first and second outputs, and outputs a corresponding codeword that contains a first transformation code corresponding to the result of said one of said first and fourth matrix multiplication operation performing means at said first output, and a second transformation code corresponding to the result of said one of said second and third matrix multiplication operation performing means at said second output when said look-up table unit is addressed by the same one of the digitized chrominance color space signals, said look-up table unit further includes a look-up table portion which has an average data field and an error data field, said average data field containing average conversion codes which are average codes of the first and second transformation codes, said error data field containing error conversion codes which are differences between the average conversion codes and corresponding ones of the first and second transformation codes, said look-up table portion outputting one of the average conversion codes and the corresponding one of the error conversion codes when addressed by the same one of the digitized chrominance color space signals, first combining means for combining an outputted one of the average conversion codes and the corresponding one of the error conversion codes in a first manner to generate a corresponding one of the first transformation codes at said first output and second combining means for combining the outputted one of the average conversion codes and a corresponding one of the error conversion codes in a second manner to generate a corresponding one of the second transformation codes at the second output.

22. The apparatus of claim 21, wherein said first combining means includes an adder, and said second combining means includes a subtracter.

* * * * *